Jan. 15, 1952 C. YOUNG 2,582,895
DUAL TRANSMISSION CONTROL
Filed Oct. 19, 1949 2 SHEETS—SHEET 1
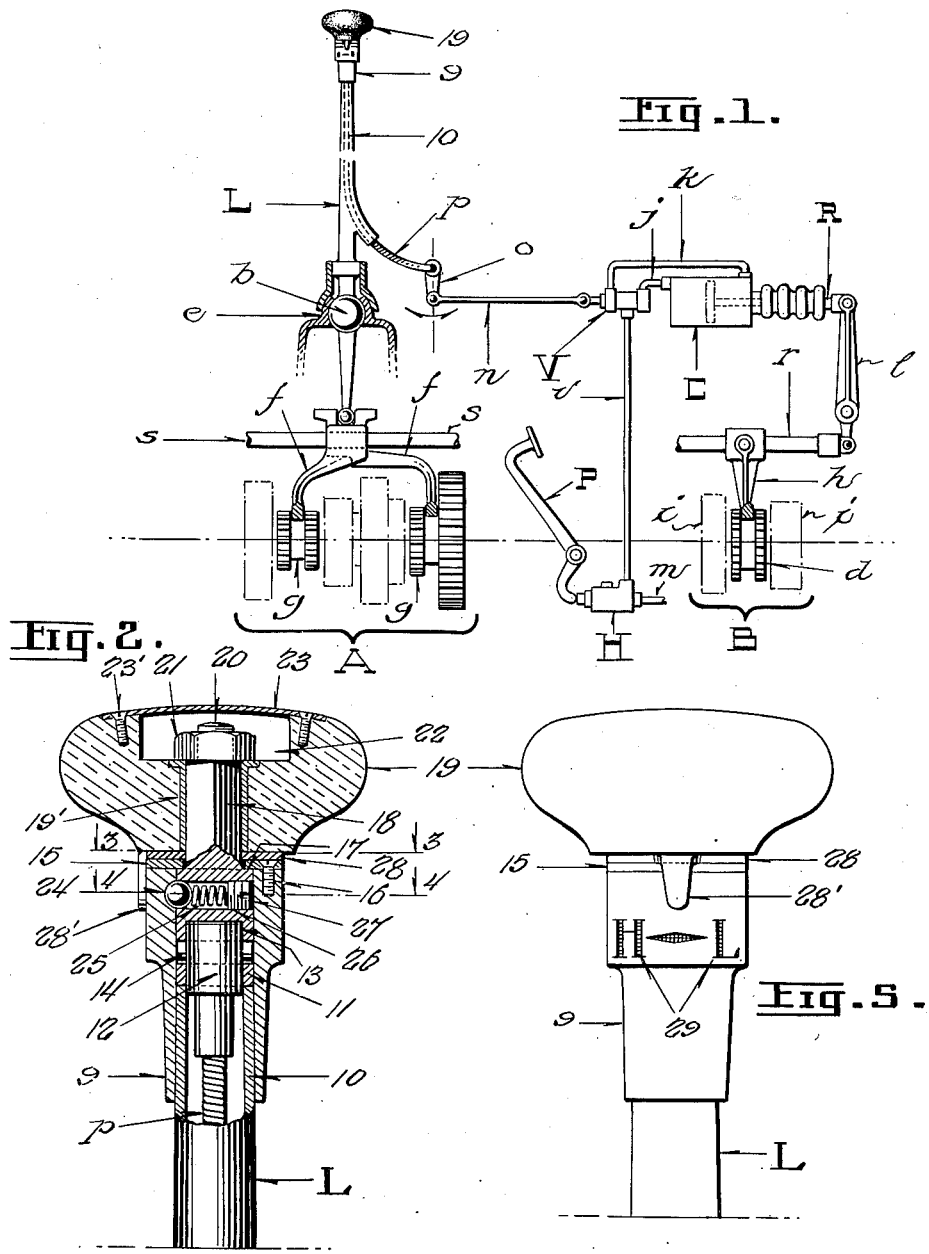
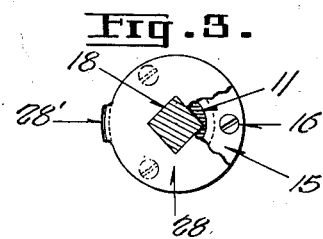
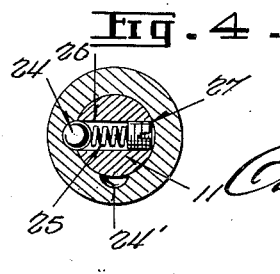
Inventor:
Cannon Young

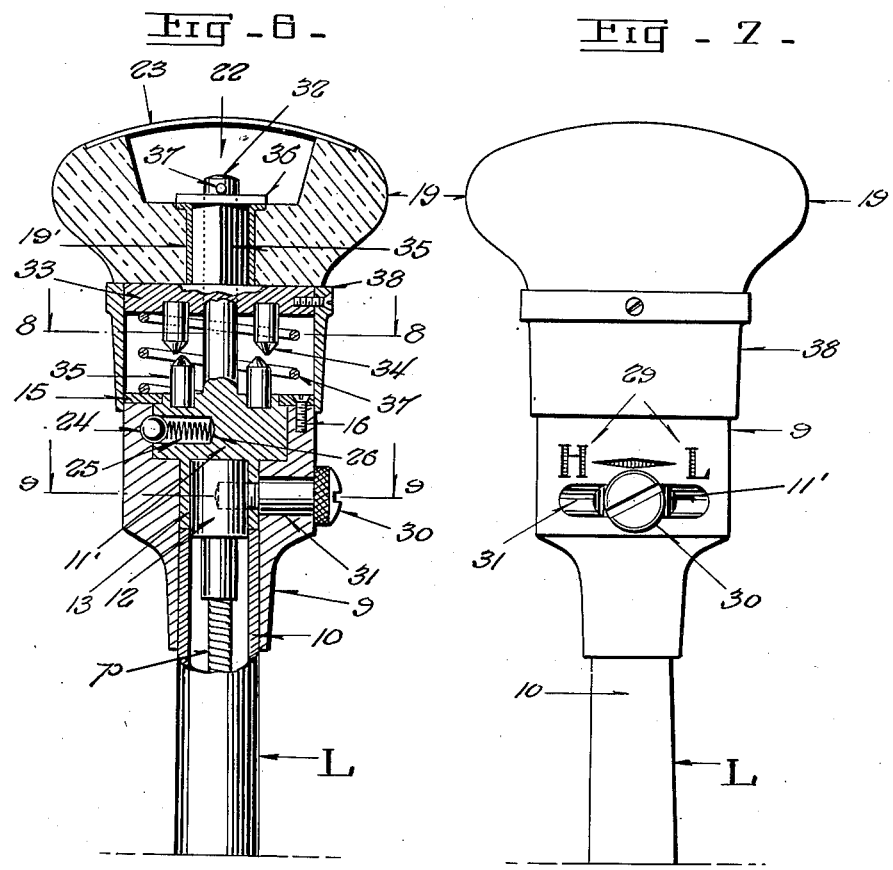
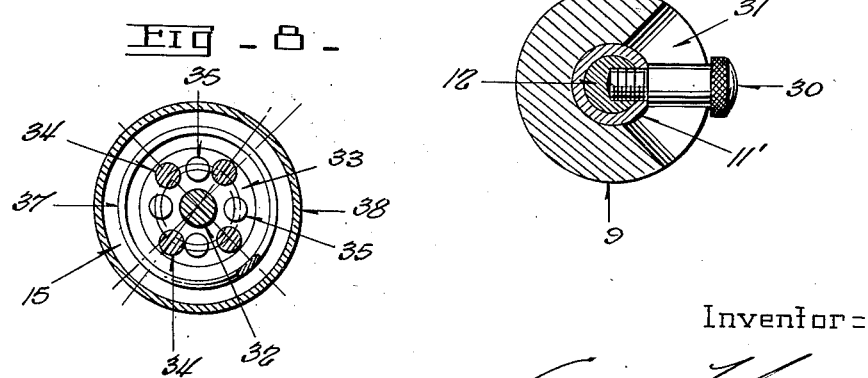

Patented Jan. 15, 1952

2,582,895

UNITED STATES PATENT OFFICE 2,582,895

DUAL TRANSMISSION CONTROL

Casanave Young, Milwaukee, Wis., assignor to Ernest R. Sternberg, Wauwatosa, Wis., executor of the estate of Ernest M. Sternberg Application October 19, 1949, Serial No. 122,174

5 Claims. (Cl. 74—745)

The present invention is directed to a single shifting unit, for selective simultaneous or independent control of dual transmissions such as employed in heavy duty high speed automotive trucks. Dual transmissions usually include a main variable speed transmission of four or more selections and an auxiliary two-speed reduction transmission, or a main transmission and a double reduction differential drive housed in a rear axle or stub shaft casing.

The aim of the invention is to improve controls of the foregoing types, such as described in U. S. Letters Patents Nos. 1,866,662 and 2,445,716. The purpose and advantages of such controls are fully set forth in said patents, and, therefore, need no repetition here. However, in order that a more comprehensive understanding of the present invention may be had, objections to the patented structures referred to will be briefly discussed.

Patent No. 1,866,662 discloses a main transmission gear shift lever provided with a depressible thumb button mounted in a knob secured upon the top of the shift lever and connected with a rod extending through the lever, to operate a ratchet wheel connected with a multiple valve for controlling a ram that actuates an auxiliary transmission shift. In another form of the invention illustrated in said patent, the thumb button is positively connected with the auxiliary transmission shifting mechanism, which requires manual force to initiate the shifting operation.

The present invention has primarily for its object to overcome the foregoing objections by the provision of a main transmission shift lever equipped with an oscillatory knob connected with a control apparatus for selectively effecting operation of an auxiliary transmission shifting mechanism, thus permitting the operator to employ forearm or wrist movement while firmly gripping the shift lever knob with all fingers and palm of the hand.

Incidental to the foregoing, a more specific object of the invention is to provide a selector knob on the main transmission shift lever, capable of both axial and radial movement to allow free rotation of the knob in normal inoperative position, and provide an operative connection with the auxiliary transmission shift lever when the knob is depressed.

In the drawings:

Figure 1 is a schematic view illustrating connected main and auxiliary transmissions of conventional types, the auxiliary transmission being equipped with a standard shifting mechanism controlled by the selector comprising the salient feature of the present invention;

Figure 2 is an enlarged vertical sectional view of one form of selector;

Figure 3 is a transverse sectional view taken on the line 3—3 of Fig. 2;

Figure 4 is a similar view taken on the line 4—4 of Fig. 2;

Figure 5 is a fragmentary elevational view showing the selection indicator;

Figure 6 is an enlarged vertical sectional view of a modified form of selector;

Figure 7 is a fragmentary elevational view illustrating the selector indicator shown in Fig. 6;

Figure 8 is a transverse sectional view taken on the line 8—8 of Fig. 6; and

Figure 9 is a similar view taken on the line 9—9 of Fig. 6.

Referring now more particularly to the accompanying drawings, in Fig. 1 the group of gears indicated by the letter A comprises a portion of a conventional main transmission, while the group B represents a standard double reduction auxiliary transmission. In the main transmission A a pair of forks $f$ mounted upon shift rods $s$ are actuated by a shift lever L, provided with a ball journal $b$ universally mounted in a semispherical socket $e$. The forks $f$ engage respective sets of shiftable gear clutches $g$ for selective engagement with adjacent gears to obtain variable reductions in the usual manner.

The auxiliary transmission B includes a fork $h$, fast on a shift rod $r$ actuated by a lever $l$. The fork $h$ reciprocates a shiftable tooth clutch $d$ for selective engagement with reduction gears $i$.

A piston ram R, connected to the lever $l$, operates in a vacuum cylinder C, which is connected with a control valve V through lines $j$ and $k$, to effect reciprocation of ram R within the cylinder when opened to vacuum through the valve V. In turn, the valve V is connected to a clutch pedal controlled valve H through a line $v$. A line $m$ connects the valve H with an engine manifold, or other source of suction (not shown).

The valve V is actuated by a link $n$ connected with an oscillatory arm $o$ actuated by a flexible cable $p$ extending through the tubular gear shift lever L, in the manner hereinafter described.

The apparatus thus far described is conventional, and is illustrated merely for the purpose of explanation. Obviously any type of shifting mechanism of the auxiliary transmission may be employed, as for example, instead of vacuum, or reduced pressure, hydraulic pressure or compressed air may be utilized for actuating the ram R, and in some instances it is contemplated that the selector of the present invention may be mechanically connected with the auxiliary mechanism for direct operation of the same.

With particular reference to Figures 2 to 4 inclusive, that form of selector illustrated therein comprises a sleeve 9, welded, braised, or otherwise secured upon the top of a tubular shaft 10, of which the upper portion of the gear shift lever L is formed. The sleeve 9 extends above the top of the tube 10 for reception of a barrel 11 rotatably journaled therein and supported upon the upper edge of the tube 10. A head 12 fastened upon the upper end of the flexible shaft p is secured in a socket 13, formed in the lower end of the barrel 11, by a transverse pin 14. A retaining washer 15 secured upon the top of the sleeve 9 by screws 16, engages a shoulder 17 formed on the upper end of the barrel 11 to lock the barrel against axial movement within the sleeve.

Also formed on the upper end of the barrel 11 is a squared shank 18 for reception of a knob 19, usually formed of plastic and provided with a square re-inforcing tubular insert 19′ splined on the squared shank 18. The shank 18 terminates in a reduced threaded end 20 for reception of a nut 21, which locks the knob 19 against axial movement on the shank 18. A recess 22 formed in the top of the knob 19 surrounds the nut 21, while a detachable plate 23 serves as a cover for the recess 22, and also affords a flush top for the knob to support the palm of the operator's hand. The dual purpose of the knob 19 is to effect a convenient grip for the top of the shift lever, and also oscillate the flexible shaft p, for the purpose of selective control of the valve V. Therefore in order to releasably latch the shaft p in selective operative position, the barrel 11 is provided with a ball detent 24, urged to latching position by a spring 25 mounted in a transverse bore 26. For the purpose of adjusting tension upon the spring 25, a set screw 27 is threaded into the opposite end of the bore 26. In selective operative positions, the ball detent 24 is projected into spaced semi-spherical sockets 24′, which not only serves to latch the barrel 11 in selective position, but also provides a resistance sufficient to require exerted force by the operator to oscillate the knob 19 for selective actuation of the auxiliary gear shift, thus preventing inadvertent rotation of the knob by the operator during shifting of the lever L in the selection of speeds in the main transmission A.

As previously described, it is highly important that the condition of the auxiliary transmission be designated to the operator at all times to facilitate proper selection. Therefore, a washer 28 is fitted on the squared shank 18 between the knob 19 and the retaining washer 15 for oscillation with the knob. A depending pointer 28′ formed on the washer 28 registers with informative indicia 29 provided on the outer perifery of the sleeve 9.

That form of the invention illustrated in Figures 6 to 9 inclusive, differs primarily from the selector heretofore described, in that the selector knob 19 is normally free to rotate, and upon depression operatively engages a control connected with the auxiliary transmission. The purpose of this structure is to permit free oscillatory movement of the knob during manipulation of the main transmission shift lever without inadvertently disturbing the setting of the auxiliary gear transmission.

As best shown in Figure 6, a barrel 11′, equivalent to the barrel 11 is journaled in a sleeve 9 secured to the top of the tubular shift lever L. The head 12 secured to the flexible control shaft p is fastened within the barrel 11′ by a set screw 30, the shank of which extends through an arcuate slot 31 formed in the sleeve 9, while the head of the screw, positioned on the exterior of the sleeve, designates the setting of the auxiliary transmission in accordance with indicia 29 provided on the perifery of the sleeve.

Inasmuch as the ball detent 24 merely serves to releasably latch the barrel 11′ in selective position, no means is provided to regulate tension on the spring 25, inasmuch as the knob 19 is normally in inoperative position, in which oscillation imparted to the same does not affect the auxiliary transmission control.

The barrel 11′ is provided with a stem 32, upon which a circular plate 33 is rotatably and reciprocately journaled. Fastened in the lower face of the plate 33 is a group of annularly spaced pins 34, while a similar group of opposed pins 35 is secured in the top of the barrel 11′.

As best shown in Figures 6 and 8, the axis of the pins 34 are positioned on a radius offset with relation to that of the axis of the pins 35, and in addition, relative annular spacing between the pins 34 is varied to prevent dead center engagement between the ends off the opposed sets of pins 34 and 35. The ends of the pins are tapered to facilitate their interengagement upon depression of the knob 19.

Extending upwardly from the plate 33 and surrounding the stem 32, is a squared shank 35 upon which the hank knob 19 is splined. A washer 36, retained on the upper end of the stem 32 by a pin 37, limits upward movement of the knob 19 on the stem. A coiled spring 37 disposed between the retaining washer 15 and the reciprocal plate 33 urges the plate and knob 19 into inoperative position in which the pins 34 are disengaged from the pins 35 to permit free rotation of the knob without affecting the auxiliary transmission control. A cylindrical apron 38 secured to the plate 33 extends downwardly over the sleeve 9 to enclose the spring 37 and pins 35 and 34 and prevent entrance and accumulation of obstructive matter.

From the description given, considered in connection with the accompanying drawings, it is believed that the operation of the present invention will be apparent, in that the main transmission lever is shifted by the operator with the knob 19 gripped in the hand in the usual manner. In that form of selector shown in Figures 1 to 5 inclusive, when a shift in the auxiliary transmission is desired, it is necessary for the operator to exert noticeable effort to release the spring urged detent 24 in order to rotate the barrel 11 and control shaft p. Upon rotation of the shaft p the arm o is rotated to operate the valve V through the link connection n. In turn the valve V controls vacuum upon opposite sides of the ram head positioned within the cylinder C, and through the lever l and shift rod r, the fork h is reciprocated to shift the gear clutch d for selective engagement with the spaced reduction gears i contained in the auxiliary transmission B.

Vacuum is created in the valve V through the line V and valve H, which is normally opened to the line $m$ communicating with an intake manifold or other source of suction, and inasmuch as the valve H is controlled by the clutch pedal P, the vacuum is only effective when the pedal is released and the clutch is in. As is customary, in making reduction shifts the clutch is released by depression of the pedal P, which cuts off vacuum from the valve V. Selective control of the auxiliary shift can then be made prior, during or after shifting the lever L. However, actuation of the auxiliary shift will not be effective until the clutch pedal P is released, again opening communication between the vacuum lines $m$ and $v$.

As previously stated, operation of the selector shown in Figures 6 to 9 is the same as described above, except in that the knob 19 must be depressed to effect interengagement between the pins 34 and 35 in order to rotate the barrel 11' through oscillation of the knob 19.

The advantage of the present invention resides in the fact that selective control of the auxiliary transmission is obtained through oscillation of the selector knob 19 firmly gripped with the operator's entire hand, which enables him to utilize a full wrist and forearm movement to easily overcome resistance of the multiple connections between the selector knob and the auxiliary transmission actuating mechanism, which can not be accomplished with only one or two fingers.

The indicator provided enables the operator at all times to determine the setting in the auxiliary transmission reduction, thus avoiding improper and unnecessary selections.

In addition to the foregoing, the present connection between the selector and auxiliary transmission control is entirely housed to protect the same from dirt and water, and confine lubrication for a maximum period of time.

I claim:

1. In a dual transmission system including variable speed main and auxiliary transmissions and a manually operative tubular shaft for selective control of the main transmission; a control for said auxiliary transmission, a portion of said control extending through said lever, a hand knob reciprocatively and rotatably mounted on the upper end of said lever for operative engagement with said control, resilient means for urging said knob to inoperative position disengaged from said control and freely rotatable, and tensional means for releasably latching said control in selective operative positions.

2. In a dual transmission system including variable speed main and auxiliary transmissions, a manually operative tubular shift lever for selective control of the main transmission, a barrel rotatably mounted in the upper end of said shift lever, a hand knob mounted on said barrel for actuation of said shift lever and independent rotation of said barrel, tensional means mounted in said barrel for latching the same in selective positions and opposing inadvertent rotation of said knob, and a control connection between said barrel and said auxiliary transmission, said connection extending through a portion of said shift lever and having its upper end secured to said barrel.

3. In a dual transmission system including variable speed main and auxiliary transmissions, a manually operative tubular shift lever for selective control of the main transmission, a barrel rotatably mounted in the upper end of said shift lever, a hand knob mounted on said barrel for actuation of said shift lever and independent rotation of said barrel, tensional means mounted in said barrel for latching the same in selective positions and opposing inadvertent rotation of said knob, a control connection between said barrel and said auxiliary transmission, said connection extending through a portion of said shift lever and having its upper end secured to said barrel, and means for visibly indicating the operative position of said auxiliary transmission.

4. In a dual transmission system including variable speed main and auxiliary transmissions and a manually operative tubular shift lever for selective control of the main transmission, a barrel rotatably mounted in the upper end of said shift lever, a hand knob reciprocatively and rotatably mounted on said barrel for actuation of said shift lever and selective rotation of said barrel, a clutch between said knob and barrel for operatively connecting the same upon depression of said knob, resilient means normally urging said knob to disconnected position relative to said barrel, and a control connection between said barrel and said auxiliary transmission.

5. In a dual transmission system including variable speed main and auxiliary transmissions and a manually operative tubular shift lever for selective control of the main transmission, a barrel rotatably mounted in the upper end of said shift lever, a hand knob reciprocatively and rotatably mounted on said barrel for actuation of said shift lever and selective rotation of said barrel, a clutch between said knob and barrel for operatively connecting the same upon depression of said knob, resilient means normally urging said knob to disconnected position relative to said barrel, a control connection between said barrel and said auxiliary transmission, and means for visibly indicating the position of said auxiliary transmission.

CASANAVE YOUNG.

REFERENCES CITED

The following references are of record in the file of this patent:

UNITED STATES PATENTS

| Number | Name | Date |
| --- | --- | --- |
| 1,669,438 | Aikman | May 15, 1928 |
| 1,983,063 | Boits | Dec. 4, 1934 |
| 2,026,220 | Denker | Dec. 31, 1935 |
| 2,144,022 | Kliesrath | Jan. 17, 1939 |
| 2,445,716 | Sternberg | July 20, 1948 |
| 2,498,835 | Brotman | Feb. 28, 1950 |